United States Patent [19]
Nichols et al.

[11] Patent Number: 5,876,644
[45] Date of Patent: Mar. 2, 1999

[54] FOOD QUALITY POLYESTER RECYCLING

[75] Inventors: Carl S. Nichols, Waxhaw; Tony Clifford Moore, Charlotte, both of N.C.

[73] Assignee: Wellman, Inc., Shrewsbury, N.J.

[21] Appl. No.: 703,491

[22] Filed: Aug. 27, 1996

[51] Int. Cl.⁶ .................................................. B29C 47/36
[52] U.S. Cl. ..................... 264/101; 264/141; 264/176.1; 264/920; 428/35.7; 521/48; 521/48.5
[58] Field of Search ................... 264/101, 85, 211.24, 264/141, 331.21, 37, DIG. 69, 920, 142, 143, 176.1; 521/48, 48.5; 428/35.7

[56] References Cited

U.S. PATENT DOCUMENTS

| | | |
|---|---|---|
| 3,344,091 | 9/1967 | Russin et al. . |
| 3,652,466 | 3/1972 | Hittel et al. . |
| 4,138,374 | 2/1979 | Currie . |
| 4,368,274 | 1/1983 | Scott .......................................... 521/48 |
| 4,870,110 | 9/1989 | Mehra et al. . |
| 5,049,647 | 9/1991 | Al-Ghatta . |
| 5,102,594 | 4/1992 | Burlett et al. ............................ 264/101 |
| 5,143,308 | 9/1992 | Hally et al. ............................... 241/76 |
| 5,225,130 | 7/1993 | Deiringer . |
| 5,225,137 | 7/1993 | Sadr ........................................ 264/349 |
| 5,283,295 | 2/1994 | Light et al. . |
| 5,298,530 | 3/1994 | Gamble et al. . |
| 5,308,562 | 5/1994 | Wohlfahrt-Laymann ................ 264/101 |
| 5,391,582 | 2/1995 | Muschiatti et al. ......................... 521/81 |
| 5,503,790 | 4/1996 | Clements ............................. 264/176.1 |
| 5,523,329 | 6/1996 | Moore et al. .............................. 521/48 |
| 5,552,198 | 9/1996 | Hitlner et al. .......................... 428/35.7 |
| 5,554,657 | 9/1996 | Brownscombe et al ................... 521/48 |
| 5,559,159 | 9/1996 | Sublett et al. .......................... 521/48.5 |

FOREIGN PATENT DOCUMENTS

| | | |
|---|---|---|
| 0422282 | 4/1991 | European Pat. Off. . |
| 0 483 665 | 5/1992 | European Pat. Off. . |
| 57-29424 | 2/1982 | Japan ....................................... 264/37 |

OTHER PUBLICATIONS

*Plastics, Rubber, and Paper Recycling A Pragmatic Approach*, C. P. Rader et al., ACS Symposium Series, American Chemical Society, Washington, DC 1996, pp. 458–471.

*Pet Recycling Beverage Bottler Closes The Loop On RPET*, Package Manufacturing, Packaging Digest, Jun. 1995, pp. 65–66 and 71.

Database WPI; Week 9252 Derwent Publications Ltd., London, GB; AN 92–424642; XP002057826 & BR 9 202 682 A (Siebje T), 24 Nov. 1992 (abstract).

Database WPI; Week 9150 Derwent Publications Ltd., London, GB; AN 91–361996; XP002057827 & CA 2 033 493 A (Collette W N), 24 Sep. 1991 (abstract).

*Primary Examiner*—Jan H. Silbaugh
*Assistant Examiner*—Mark Eashoo
*Attorney, Agent, or Firm*—Philip Summa

[57] ABSTRACT

A method of recycling post-consumer polyester to obtain recycled polyester of sufficiently high purity to meet food packaging requirements is disclosed. The method includes cleaning comminuted pieces of post-consumer polyester to remove surface contaminants; melting the surface-cleaned post-consumer polyester pieces; extruding the post-consumer melt; blending the melt of post-consumer polyester with a melt of virgin polyester prepolymer; solidifying and pelletizing the blended melt while the virgin polyester prepolymer remains as prepolymer; and polymerizing the solid blended pellets in the solid state.

26 Claims, 2 Drawing Sheets

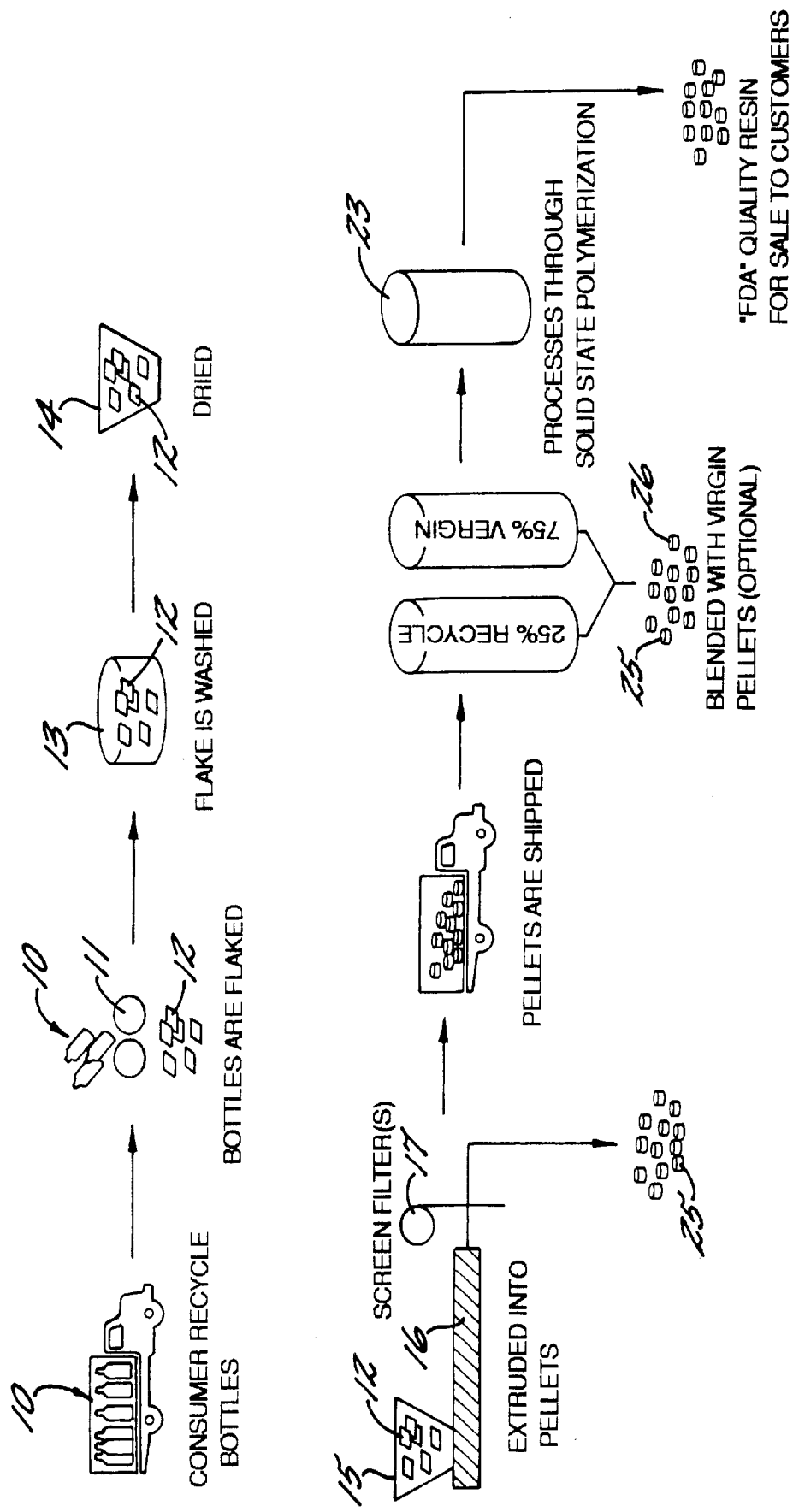

FOOD QUALITY POLYESTER RECYCLING

FIELD OF THE INVENTION

The present invention relates to recycling of post-consumer polymer products, and in particular relates to recycling post-consumer items made of polyester into a recycled polyester product that is sufficiently pure to meet the appropriate standards for packaging food products.

BACKGROUND OF THE INVENTION

The widespread use of polymer-based products ("plastics") in consumer goods has lead to a corresponding interest in suitable methods for reclaiming or recycling as much of these products as is practical. The interest in such recycling is driven by several considerations. These include: environmental factors, principally occupation of landfills and other disposal issues; preservation of limited resources, because polymers are a product in the chain of petrochemicals that begins with crude oil; and economic interests, because the cost of post-consumer plastic is less related to the cost of raw materials, and instead is more dependent upon the cost of physically collecting and transporting post-consumer plastic objects to an appropriate facility for recycling. Additionally, public policy is expected to continue to emphasize environmental issues, and thus legal requirements for recycling are already in force in some jurisdictions, and are expected in others in the future.

Interest in post-consumer recycling has increasingly focused upon polyester (i.e. polyethylene terephthalate, "PET," and related compounds). More specifically, for several decades polyester found its widest use as a synthetic material for textile products. Because polyester is typically blended and textured when incorporated into yarns and fabrics, the task of recycling textile materials is quite different from the task of recycling molded polyester objects.

In more recent years, however, polyester chemistry and the techniques for molding polyester have developed to the point at which polyester has become widely used as a material for "disposable" beverage bottles. Accordingly, these polyester bottles, once disposed of, present a significant opportunity for economical and efficient recycling, provided appropriate techniques can be developed.

In this regard, the term "recycling" often tends to be used relatively broadly, but actually covers a number of different ways to reuse any given material. Thus, in one sense, if a polyester bottle is used to contain a non-food product liquid rather than being directly disposed of, it has been "recycled", but the term "recycled" is rarely applied to such follow-up use of an empty container. Instead, recycling is typically identified as falling into one of three general categories, which are also recognized by the U.S. Environmental Protection Agency (EPA) and the U.S. Food and Drug Administration (FDA). The first is primary recycling; the use of pre-consumer industrial scrap and salvage. The second is secondary recycling, which refers to the physical reprocessing (e.g., grinding and re-extruding) of the polymer. The third is tertiary recycling in which a polymer is reprocessed to isolate chemical components and reuse them in manufacturing a new product.

Because the present invention deals with post-consumer recycling, primary recycling will not be addressed further herein. As used herein, the term "post-consumer" refers to polyester objects (e.g. food containers or bottles) that have been disposed of after their initial use. Because such containers or bottles are generally treated as household trash, or even re-used for non-food compositions, they may contain various contaminants or contaminant residues when submitted for recycling.

With respect to polyester, tertiary recycling generally falls into one of several chemical processes that reduce polyester (typically polyethylene terephthalate) back into its component monomers (terephthalic acid and ethylene glycol) in some sort of depolymerizing step. Typical depolymerizing steps include methanolysis as for example practiced by Eastman Chemical Company, and Hoechst. Shell practices another process referred to as "glycolysis," and which mixes post-consumer polyester with glycol (and potentially other compounds) to break it back down into its component precursors.

Other recycling techniques provide methods for removing companion materials often used with polyester in consumer products. In this regard, U.S. Pat. No. 5,523,329 to Moore et al. for "Recovery of Polyester From Spent Film," which is commonly assigned with the pending application, describes a method of removing polyvinylidene (PVDC) from a polyester substrate, a combination which is often used, for example, as a substrate for photographic film and their emulsions.

In order to be used to package food products, any polymer whether virgin or recycled must meet the appropriate standards for food contact. As used herein, the term "virgin" refers to polymers made directly from chemical precursors, and because of which their purity is generally considered to be acceptably high. Thus, in seeking to produce a food quality polyester from post-consumer polyester, the recycling process must not only produce a reconstituted polyester with appropriate physical and chemical characteristics, but must also be sufficiently pure to meet food quality standards.

In the United States the FDA has generally taken the position that the levels of recycle related contaminants present in food contact articles must be low enough to ensure that the resulting "dietary exposure" to those substances is less than one-half part per billion (ppb). According to FDA calculations, the residual concentration of possible contaminants in the food packaging material should be no more than about 215 ppb. At these levels, if a contaminant were present in a polyester container made from recycled material, and if the contaminant was assumed to migrate entirely (100%) into the food, the concentration of the contaminant in the daily diet would be on the desired order of less than 0.5 ppb based on a 5 percent PET consumption factor (i.e. the FDA assumes that 5 percent of food is packaged in polyester).

At levels greater than about 215 ppb, migration studies can also be used to demonstrate that the concentration in a daily diet would still fall to 0.5 ppb or less.

As noted above, if a polymer such as polyester is manufactured from pure precursor components such as terephthalic acid and ethylene glycol, it can generally be produced in the desired purity ranges. Similarly, and as would be expected, if post-consumer polyester is reduced by glycolysis or methanolysis to the equivalent of pure starting materials, which are then re-reacted to form monomer and re-polymerized to form polymer, a similar purity level can be achieved. The disadvantage, however, of such processes is that by the very nature of their extensive chemical treatment, they are more expensive and less efficient than the processes for producing polyester from virgin precursors. Because one of the objects of recycling is to promote its economic attractiveness, recycling processes that are so elaborate as to offer economic disincentives tend to be used sparingly, and occasionally only in the face of legal requirements, rather than for their marketplace advantages.

OBJECT AND SUMMARY OF THE INVENTION

Therefore, it is an object of the present invention to provide a method for recycling post-consumer polyester, and a resulting recycled polyester product, that minimizes the disadvantageous and less efficient use of depolymerization or similar chemical reactions, and instead provides an economically advantageous method for recycling polyester.

The invention meets this object with a method of recycling post-consumer polyester to obtain recycled polyester of sufficiently high purity to meet food packaging requirements which comprises cleaning comminuted pieces of post-consumer polyester to remove surface contaminants therefrom; melting the surface-cleaned post-consumer polyester pieces; extruding the post-consumer melt; blending the melt of post-consumer polyester with a melt of virgin polyester prepolymer; solidifying and pelletizing the blended melt while the virgin polyester prepolymer remains as a prepolymer; and polymerizing the solid blended pellets in the solid state.

In another aspect of the invention, the post-consumer polyester and virgin polyester are both first pelletized, after which a blend of the respective pellets is polymerized in the solid state.

In yet a further aspect, the intrinsic viscosity (IV) of the post-consumer polyester is reduced somewhat prior to solid state polymerization or blending with virgin polyester precursor.

BRIEF DESCRIPTION OF THE DRAWINGS

FIG. 2 is a schematic flow diagram of a second embodiment of the method of the present invention.

DETAILED DESCRIPTION

Figure 1:
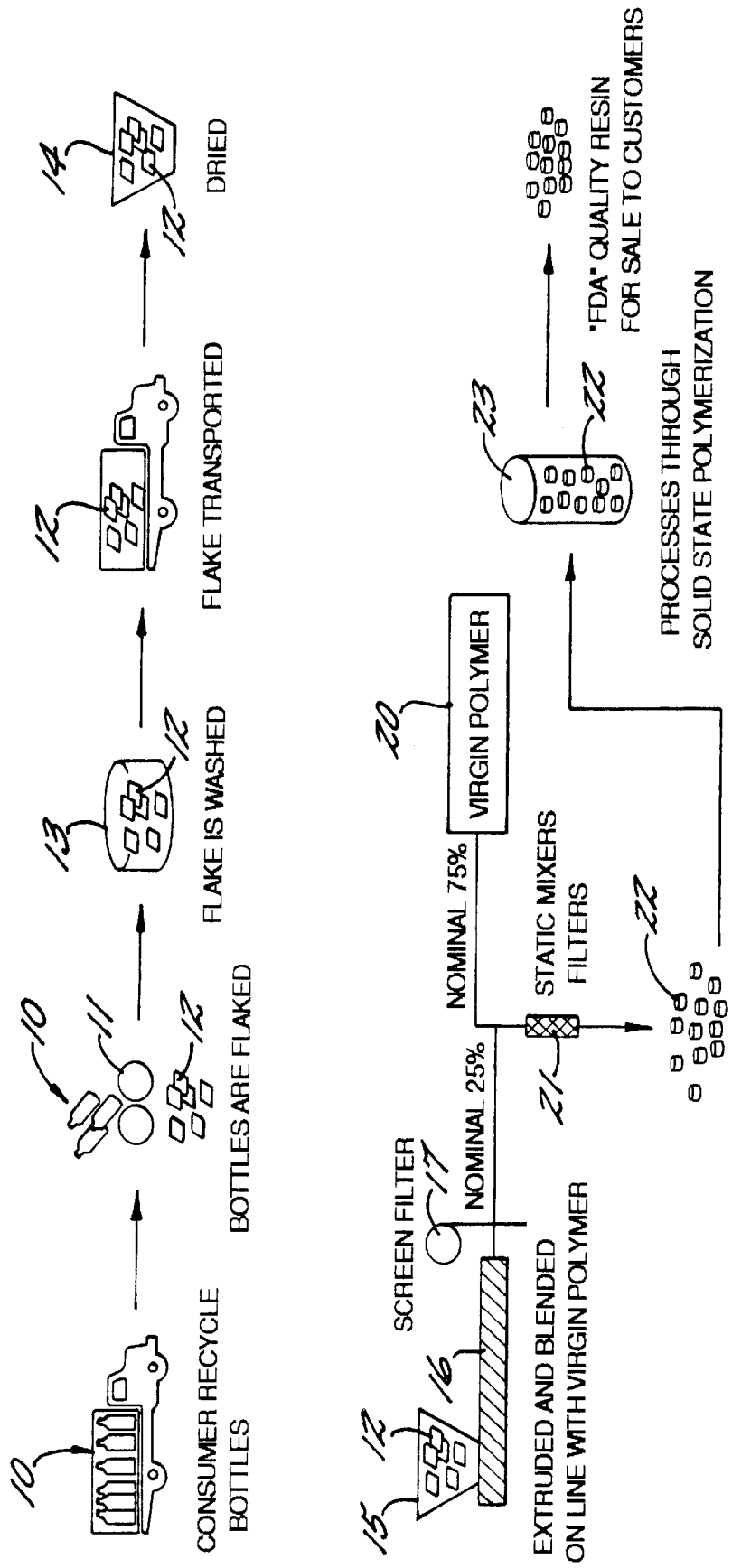
FIG. 1 is a schematic flow diagram of a first embodiment of a recycling process according to the present invention.

The present invention is a method of recycling post-consumer polyester to obtain recycled polyester of sufficiently high quality and purity to meet food packaging requirements.

FIG. 1 illustrates a first embodiment of the present invention. Post-consumer polyester bottles broadly designated at 10 are typically transported from consumer recycling collection sites to a comminuting facility illustrated schematically by the circles 11 that comminutes the bottles into pieces, typically flakes 12, of post-consumer polyester. At this point, because the bottles 10 have been disposed of either in the midst of other consumer trash or under other similar circumstances, they typically contain varying amounts of surface contaminants—i.e. dirt—which are removed in a washing step 13. Any appropriate combination of solvents, surfactants, water, agitation and other ingredients and techniques can be used to wash the flakes, and in a preferred embodiment the flakes are washed in a combination of basic solution (e.g. sodium hydroxide, NaOH) and detergent at a temperature of between about 20° and 75° C.

FIG. 1 also illustrates one of the advantages of the invention, in that the washed flakes can be transported as flakes to a different location for further processing. Accordingly, the comminuting and washing portions of the method can be carried out at separate locations as may be desired or convenient. The invention can, of course, be carried out entirely in a single location as well.

In a next step, the flakes are dried in a drying facility 14 at a temperature that is sufficient to remove volatile organic compounds and water without otherwise substantially changing the chemical characteristics of the comminuted pieces of polyester. Because melting points for polyester are typically about 250° C., the drying steps should be carried out at a somewhat lower temperature, e.g. 130°–200° C. to accomplish the drying while avoiding any chemical changes. Somewhat higher temperatures can be used, however, in an inert atmosphere, such as nitrogen ($N_2$).

The surface cleaned post-consumer polyester pieces 12 are then melted in an appropriate heating device 15 and then extruded in the melt phase using the extruder 16. If desired, the step of extruding the melt can further comprise applying a vacuum to the melt to remove additional amounts of volatile organic materials and water that remain after the drying step. The melt also can be filtered, for example, through a screen filter 17 either before extrusion or afterwards. Extrusion is preferably carried out in a two-stage single screw extruder that provides a simple and efficient extrusion step. Such extruders are well known to those of ordinary skill in the polymer and polyester arts, and will not be otherwise discussed in detail herein. Cascade extrusion can also be used, in which the first portion of the extruder melts the polyester, which then drops to a volatizing column where it is subjected to a gas sweep to further purify it, after which the swept and melted polyester is extruded. Additionally, extruders with designs other than two-stage single screw can be incorporated as may be desirable or necessary.

In this regard, the extrusion step slightly reduces the molecular weight of the post-consumer polyester, i.e. from an intrinsic viscosity (IV) of between about 0.7 and 0.8 to an IV of between about 0.6 and 0.7. Preferably, the IV of the post-consumer melt will be within about 0.1 of the IV of the virgin polyester prepolymer with which it is blended in the next step. Although various specific techniques are used for measuring IV, it will be understood that the invention is not limited to any one particular technique, provided that the measurements are made in consistent fashion with one another.

In the next step of the invention, the melt of post-consumer polyester is blended with a melt of virgin polyester precursor resin 20, which is a relatively low IV (0.5–0.7 with 0.58–0.64 preferred) polyester typically used for later solid state polymerization. The blending step typically uses static mixers, and potentially includes filters, both of which are conventional in this art and will not otherwise be discussed in detail herein. Similarly appropriate formulations and techniques for producing virgin polyester are widely known in their art, and will not otherwise be discussed in detail herein. The basic formulation is of course, the condensation reaction between terephthalic acid and ethylene glycol followed by polymerizations to a desired molecular weight.

The blended melt is then solidified and pelletized to produce a plurality of blended pellets 22 in which each pellet contains the blend of the virgin polyester and the post-consumer polyester. In preferred embodiments, a greater amount of virgin polymer is blended with a lesser amount of recycled polymer, with proportions of about 75% virgin polymer and 25% post-consumer polymer being particularly favored.

The pellets 22 are then polymerized in the solid state ("solid phase") using appropriate solid state polymerization equipment which is broadly designated in FIG. 1 at 23. Various apparatus and techniques are available for carrying out solid state polymerization and are generally well known in this art. Exemplary techniques are set forth for example in U.S. Pat. Nos. 4,064,112; 4,154,920; 4,165,420; and 4,238,593. As will be set forth later herein with respect to specific examples, the solid state polymerization process encourages further diffusion of volatile organic impurities from the pellets, and results in polyester pellets that meet FDA guidelines for use in food packaging.

FIG. 2 shows an alternative embodiment of the present invention. Where the steps and apparatus illustrated in FIG. 2 are otherwise the same as those of FIG. 1, the same reference numerals will be used with respect to FIG. 2 as were used with FIG. 1. FIG. 2 again illustrates that the bottles 10 can be collected and transported to the comminuting facility 11 where they are typically formed into flakes and washed. The flakes are again dried, melted, filtered, and extruded into pellets 25. The pellets 25 in FIG. 2 differ, however, from those in FIG. 1 in that the pellets 25 are formed entirely of post-consumer polyester while the pellets 22 in FIG. 1 each are a blend of virgin polyester and post-consumer polyester.

FIG. 2 illustrates that the steps of collection, comminuting, washing, drying, melting, extruding, and pelletizing are all carried out at an initial facility, following which the post-consumer pellets can be shipped to a second facility. In the embodiment of FIG. 2, the post-consumer pellets 25 are blended with pellets 26 that are formed entirely of virgin polyester. This produces a blend of pellets in which each individual pellet is either entirely post-consumer polyester or entirely virgin polyester. This blend of pellets is then subjected to solid state polymerization in the manner just described to produce fully polymerized polyester pellets that also meet FDA food contact requirements.

As in the first embodiment, a greater amount of virgin polyester pellets (e.g. 75%) is preferably mixed with a somewhat lesser amount (e.g. 25%) of post-consumer pellets to form the blend which is forwarded to solid state polymerization.

Tables 1–4 illustrate the advantages of the invention and its beneficial cumulative effect for the removal of contaminants and contaminant residues from post-consumer bottles.

TABLE 1

| Process | Sample No. | Initial Level | Final Level | Ratio | 1000 ppm Basis[1] |
|---|---|---|---|---|---|
| Toluene Study | | | | | |
| Incoming flake | | | | | 1000 |
| Wash | | | | | 1000 |
| Flake dryer | TCM-4-78-5/6 | 1840 | 1.6 | 1150 | 1 |
| Flake extrusion | | | | 1 | 1 |
| Solid State Polymerization (0.1 IV increase) | TCM-4-99-1 | 5.85 | (N.D.)[2] | 27 | 0.032 |
| Phenyldecane | | | | | |
| Wash | 005-2A1 | 59 | 7 | 8.4 | 7 |
| Flake Dryer | NEC 10934 | 807 | 1.23 | 656 | 0.011 |

[1] i.e., reduction values calculated from actual amounts, but expressed proportionally as if starting from 1000 ppm in accordance with FDA assumptions.
[2] i.e., below the 0.215 detection limit

TABLE 2

Calcium Monomethyl Arsenate Study

| Process | Sample No. | Initial Level | Final Level | Ratio | 1000 ppm Basis |
|---|---|---|---|---|---|
| Wash | 005-2A1 | 17.2 | 3 | 5.9 | 3 |

| Migration Studies | | Measure As level in sheet (PPM) | Measure As level in solvent (ppb) with 10 ppb limit of detection |
|---|---|---|---|
| 8% ETOH[3]-120 F for 720 hours | TCM-4-39B | 5.89 | N.D. |
| 50% ETOH-120 F for 720 hours Hot Fill | TCM-4-39B | 5.89 | N.D. |
| 8% ETOH-120 F for 720 hours | TCM-4-39B | 5.89 | N.D. |
| 50% ETOH-120 F for 720 hours | TCM-4-39B | 5.89 | N.D. |

[3] -Ethanol, $CH_3CH_2OH$

TABLE 3

Benzophenone Study

| Process | Sample No. | Initial Level | Final Level | Ratio | 1000 ppm Basis |
|---|---|---|---|---|---|
| Wash | 005-2A1 | 320 | 130 | 2.5 | 130 |
| Flake drying | NEC 10934 | 655 | 37.8 | 17 | 7.5 |
| Solid State Polymerization (0.1 IV) | | 101 | 4.79 | 21 | 0.4 |

| Migration Studies | | Measure BZ level in sheet (PPM) | Measure BZ level in solvent (ppb) | Ratio | ppb |
|---|---|---|---|---|---|
| 8% ETOH-120 F for 720 hours | TCM-4-39B | 390 | 21.8 | 17890 | 0.02 |
| 50% ETOH-120 F for 720 hours Hot Fill | TCM-4-39B | 390 | 1120 | 348 | 1.02 |
| 8% ETOH-120 F for 720 hours | TCM-4-39B | 390 | 58 | 6724 | 0.05 |
| 50% ETOH-120 F for 720 hours | TCM-4-39B | 390 | 1520 | 257 | 1.39 |

TABLE 4

Chloroform Study

| Process | Sample No. | Initial Level | Final Level | Ratio | 1000 ppm Basis |
|---|---|---|---|---|---|
| Incoming bottle | | | | | 1000 |
| Wash | | | | | 1000 |
| Flake dryer | TCM-4-90-2 | 252 | 2.79 | 90 | 11 |
| Flake extrusion | SN-1-34D2/SM-1-34 | 227 | 67 | 3 | 3 |
| Solid State Polymerization (0.1 IV) | TCM-4-99-2 /SSP | 56.8 | 0.215 (N.D.) | 264 | 0.012 |

For example, Table 1 demonstrates the decrease in toluene levels from the original post-consumer polyester through solid state polymerization. As demonstrated in Table 1, if the flaked material has 1000 parts per million (ppm) by weight of toluene prior to washing, the washing step removes almost none of it. The drying step, however, reduces the toluene levels of a sample within an initial toluene level of 1840 ppm to 1.6 ppm, a reduction ratio of over 1000. Following the extrusion step, the solid state polymerization (for a different sample) reduces the toluene level from 5.85 ppm following extrusion to 0.215 ppm following solid state polymerization, a reduction ratio of 27, resulting in a final toluene level of 0.032 ppm, or 32 parts per billion (ppb).

Table 2 demonstrates that phenyldecane can be greatly reduced by the simple steps of washing and drying, and Table 3 shows similar results for washing and drying calcium monomethyl arsenate.

Table 4 illustrates the reduction of benzophenone using the present invention, and Table 5 shows the reduction of chloroform using the present invention.

In each case, the reduction is cumulative from step to step, thus resulting in the high purity of the resulting final material.

In another embodiment, the invention comprises the method of recycling post-consumer polyester by reducing the intrinsic viscosity of surface-cleaned, comminuted, post-consumer polyester by between about 0.02 and 0.3 IV units by adding a component from the group consisting of water, dihydric alcohols, and polyhydric alcohols; melting the surface-cleaned post-consumer polyester pieces; extruding the post-consumer melt; blending the melt of post-consumer polyester with a melt of virgin polyester precursor; solidifying and pelletizing the blended melt; and polymerizing the solid blended pellets in the solid state.

The component can be added to the melt of post-consumer polyester or can be added to the surface-cleaned comminuted pieces of post-consumer polyester prior to the step of melting the post-consumer polyester. Indeed, under proper ambient conditions, the step of adding the component can comprise adding water by storing the surface-cleaned comminuted post-consumer polyester under ambient humidity conditions for a time sufficient for the IV to reduce by between about 0.02 and 0.03 IV units. In another embodiment, the step of adding a component comprises proactively adding ethylene glycol, another appropriate dihydric alcohol, or a polyhydric alcohol. Those polyhydric alcohols appropriate for such use will be consistent with the polymers described in title 21 of the Code of Federal Regulations, particularly Subchapter B, "Food for Human Consumption;" and Part 177 of that subchapter, "Indirect Food Additives, Polymers; Substances for Use as Basic Components of Single and Repeated Use Food Contact Surfaces." With respect to polyester, the appropriate substances are set forth at Section 177.1630 "Polyethylene Phthalate Polymers."

In yet another embodiment, the invention can comprise reducing the intrinsic viscosity of surface-cleaned comminuted post-consumer polyester by between 0.02 and 0.3 IV units by adding a component from the group consisting of water, dihydric alcohols, and polyhydric alcohols; melt extruding the surface-cleaned post-consumer polyester pieces; and then solidifying, pelletizing, and polymerizing the post-consumer polyester in the solid state. In both of these latter embodiments, the reduction in the IV helps match the IV to that of the polyester precursor with which the post-consumer polyester can be blended to improve product uniformity, and (blended or not) provides for additional residence in the solid state polymerization step which, as noted above, also serves to further purge the post-consumer polyester of any remaining organic materials.

As in the earlier described embodiments, the process of these latter embodiments can also include the comminuting steps, filtering of the post-consumer melt prior to its extrusion, washing the comminuted pieces to remove contaminants, drying the washed comminuted pieces, and applying a vacuum to the melt being extruded to help remove volatile organic materials and water.

In the drawings and specification, there have been disclosed typically preferred embodiments of the invention and, although specific terms have been employed, they have been used in a generic and descriptive sense only and not for purposes of limitation, the scope of the invention being set forth in the following claims.

That which is claimed:

1. A method of recycling post-consumer polyester to obtain recycled polyester with a residual concentration of possible food contaminants of no more than about 215 parts per billion suitable for food contact requirements, the method comprising:

cleaning comminuted pieces of post-consumer polyester to remove surface contaminants therefrom thereby producing surface-cleaned post-consumer polyester pieces;

melting the surface-cleaned post-consumer polyester pieces to produce a post-consumer polyester melt;

extruding the post-consumer polyester melt to reduce the intrinsic viscosity of the post-consumer polyester melt and remove additional contaminants;

blending the melt of post-consumer polyester with a melt of virgin polyester prepolymer that has an intrinsic viscosity similar to the intrinsic viscosity of the post-consumer polyester melt to produce a blended melt, and blending the melts in a proportion such that one of the melts makes up at least about 25 percent of the blended melt by weight;

solidifying and pelletizing the blended melt while the virgin polyester prepolymer remains as prepolymer to produce solid blended pellets; and polymerizing the solid blended pellets in the solid state thereby forming the recycled polyester.

2. A recycling method according to claim 1 and further comprising a step of comminuting post-consumer polyester objects into small pieces of post-consumer polyester prior to cleaning the comminuted pieces.

3. A recycling method according to claim 1 and further comprising a step of filtering the post-consumer polyester melt prior to extruding the post-consumer polyester melt.

4. A recycling method according to claim 1 wherein cleaning the comminuted pieces comprises washing the comminuted pieces to remove surface contaminants.

5. A recycling method according to claim 4 wherein cleaning the comminuted pieces comprises drying washed comminuted pieces at a temperature sufficient to remove volatile organic compounds and water without otherwise changing the chemical characteristics of the comminuted pieces.

6. A recycling method according to claim 1 wherein extruding the post-consumer polyester melt further comprises applying a vacuum to the post-consumer polyester melt being extruded to remove volatile organic materials and water.

7. A recycling method according to claim 1 wherein extruding the post-consumer polyester melt comprises extruding the post-consumer polyester melt through a two-stage single screw extruder.

8. A recycling method according to claim 1 further comprising formation of a food package from the recycled polyester following solid state polymerization.

9. A recycling method according to claim 1 further comprising formation of the virgin polyester prepolymer from the group consisting of dicarboxylic acids, dicarboxylic esters, glycols and multifunctional alcohols prior to blending the post-consumer polyester melt with the virgin polyester prepolymer melt.

10. A recycling method according to claim 1 further comprising formation of the virgin polyester prepolymer from terephthalic acid and ethylene glycol prior to blending the post-consumer polyester melt with the virgin polyester prepolymer melt.

11. A recycling method according to claim 1 wherein blending the melts comprises blending a larger proportion of the virgin polyester prepolymer melt with a smaller proportion of the post-consumer polyester melt.

12. A recycling method according to claim 11 comprising blending about 75 percent by weight of the virgin polyester prepolymer melt with about 25 percent by weight of the post-consumer polyester melt.

13. A recycling method according to claim 1 wherein blending the melts comprises blending a post-consumer polyester melt with the virgin polyester prepolymer melt in which the intrinsic viscosity of the virgin polyester prepolymer melt is lower than the intrinsic viscosity of the post-consumer polyester melt.

14. A recycling method according to claim 13 wherein the intrinsic viscosity of the virgin melt and the intrinsic viscosity of the post-consumer melt differs by about 0.1 or less.

15. A method of recycling polyester to obtain a recycled polyester with a residual concentration of possible food contaminants of no more than about 215 parts per billion suitable for food contact requirements, the method comprising:

extruding a melt of cleaned post-consumer polyester to reduce the intrinsic viscosity of the post-consumer polyester and remove additional contaminants;

solidifying and pelletizing the post-consumer melt to produce post-consumer polyester pellets;

blending the post-consumer polyester pellets with virgin polyester prepolymer pellets that have an intrinsic viscosity similar to the intrinsic viscosity of the post-consumer pellets to produce a blend of pellets, and blending the pellets in a proportion such that other of the post-consumer or virgin pellets makes up at least about 25 percent of the blend of pellets by weight; and polymerizing the blend of pellets in the solid state thereby forming the recycled polyester.

16. A method according to claim 15 and further comprising the steps of:

comminuting post-consumer polyester objects into small pieces, thereby producing comminuted polyester pieces; and cleaning the comminuted polyester pieces to remove surface contaminants therefrom, thereby producing cleaned post-consumer polyester pieces;

both prior to extruding the cleaned post-consumer polyester pieces.

17. A recycling method according to claim 16 wherein cleaning the comminuted polyester pieces comprises washing the comminuted polyester pieces to remove surface contaminants.

18. A recycling method according to claim 16 and further comprising a step of filtering the post-consumer melt prior to extruding the post-consumer melt.

19. A recycling method according to claim 15 wherein extruding the cleaned post-consumer polyester further comprises applying a vacuum to the cleaned post-consumer polyester being extruded to remove volatile organic materials and water.

20. A recycling method according to claim 15 further comprising formation of a food package from the recycled polyester following solid state polymerization.

21. A recycling method according to claim 15 further comprising formation of the virgin polyester prepolymer recycled from the group consisting of dicarboxylic acids, dicarboxylic esters, glycols and multifunctional alcohols prior to blending the post-consumer polyester melt with the virgin polyester prepolymer melt.

22. A recycling method according to claim 15 further comprising formation of the virgin polyester prepolymer from terephthalic acid and ethylene glycol prior to blending the post-consumer polyester melt with the virgin polyester prepolymer melt.

23. A recycling method according to claim 15 wherein blending the post-consumer polyester pellets comprises blending a larger proportion of the virgin prepolymer polyester pellets with a smaller proportion of the post-consumer polyester pellets.

24. A recycling method according to claim 23 comprising blending about 75 percent by weight of the virgin polyester prepolymer pellets with about 25 percent by weight of the post-consumer polyester pellets.

25. A recycling method according to claim 15 wherein polyester blending the post-consumer polyester pellets comprises blending post-consumer polyester pellets with the virgin polyester prepolymer pellets in which the intrinsic viscosity of the virgin polyester prepolymer pellets is lower than the intrinsic viscosity of the post-consumer polyester pellets.

26. A recycling method according to claim 25 wherein the intrinsic viscosity of the virgin polyester prepolymer pellets and the intrinsic viscosity of the post-consumer polyester pellets differs by about 0.1 or less.

* * * * *